Jan. 9, 1923.
C. R. KARCH.
SNUBBING ATTACHMENT FOR VEHICLES.
FILED MAY 14, 1921.
1,441,355
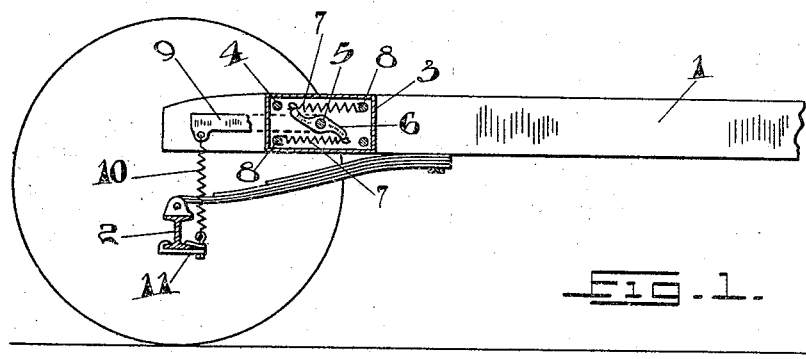
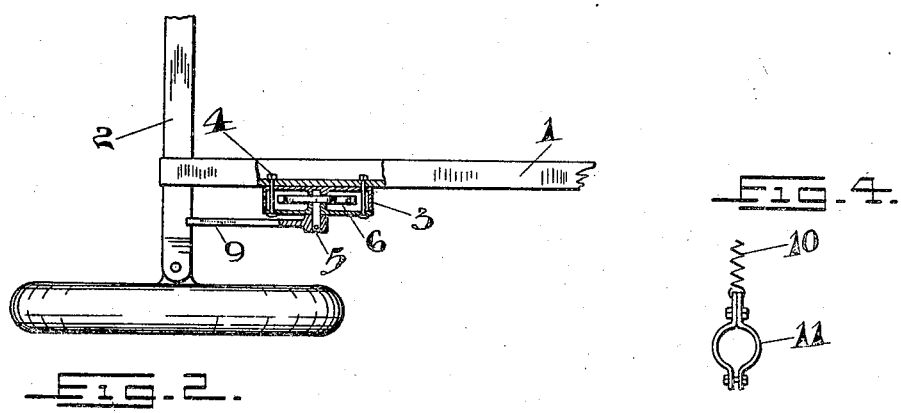
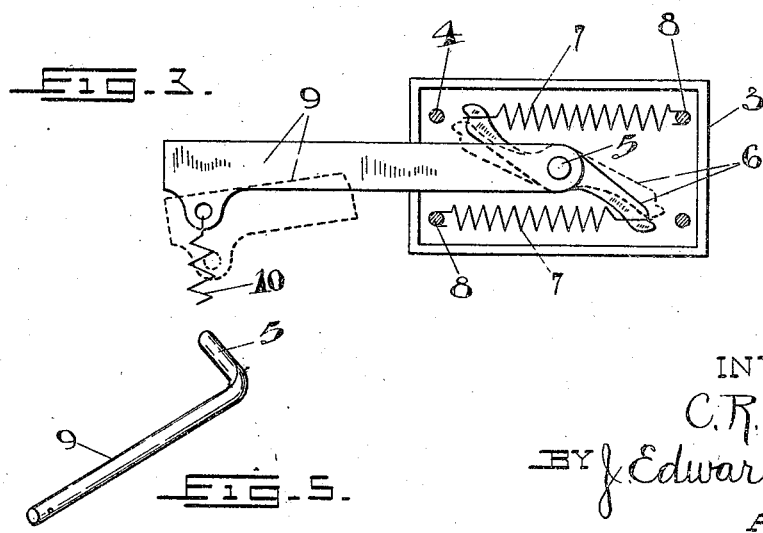
INVENTOR
C. R. Karch.
BY J. Edward Maybee.
ATTY.

Patented Jan. 9, 1923.

1,441,355

UNITED STATES PATENT OFFICE.

CHARLES ROBERT KARCH, OF BRANTFORD, ONTARIO, CANADA.

SNUBBING ATTACHMENT FOR VEHICLES.

Application filed May 14, 1921. Serial No. 469,570.

*To all whom it may concern:*

Be it known that I, CHARLES R. KARCH, of the city of Brantford, in the county of Brant, Province of Ontario, Canada, a subject of the King of Great Britain, have invented certain new and useful Improvements in Snubbing Attachments for Vehicles, of which the following is a specification.

This invention relates to improvements in snubbers or rebound absorbers for motor vehicles, and my object is to devise an efficient construction which is in itself very simple, which may be attached to the vehicle with a minimum of trouble, and which may be constructed at a reasonable cost.

I attain my object by means of the constructions hereinafter described and illustrated in the accompanying drawings in which Fig. 1 is a side elevation, partly in section, showing my device attached to a vehicle;

Fig. 2 a plan view, partly in section;

Fig. 3 a side elevation of the box, springs and lever, the cover being removed; and Fig. 4 a view showing a modified form of clip for use when the device is applied to the rear axle of a vehicle.

Fig. 5 is a detail of a modified construction of the spindle and lever.

In the drawings like numerals of reference indicate corresponding parts in the different figures.

1 is part of the frame of the chassis of a motor vehicle and 2 the front axle, both of which are of ordinary construction. 3 is a box or casing, which is secured to the member 1 by bolts or screws 4 passing through the member 1. Centrally of the box 3 is journalled the spindle 5 carrying the rock arm 6. Each end of the rock arm has connected thereto a spring 7, the other end of each spring being connected to a pin or other projection 8 on the bottom of the box 3, or the screws or bolts 4 might pass clear through the bottom of the box and the ends of the springs 7 might be connected to these projecting ends.

A lever 9 is secured to the spindle 5 which extends through the side of the box 3. The lever and spindle may, however, be made integral if desired. To the outer end of this lever is secured one end of a coil spring 10. The other end of this spring has a clip 11 secured thereto, which clip is secured to the axle of the vehicle. This clip will be formed as shown in Figs. 1 and 2 when used in connection with the front axle of the vehicle, and formed as shown in Fig. 4 when used for attachment with the rear axle.

The operation of the device is as follows. The springs 7 and the spring 10 will normally be in tension. When the wheels pass over an irregularity in the surface of the road, the axle 2 and member 1 tend to first approach one another, and then to spring apart. As the axle 2 and member 1 separate, the spring 10, which normally tends to limit the separation, is drawn on, which draws down the lever 9, which at the same time moves the spindle 5 and rocks the arm 6, the springs 7, however, tending to prevent or limit this separating movement. As the axes of the springs 7 approach the spindle 5, their effect on the lever decreases which reduces the violence of the snubbing action due to the rapidly increasing tension of the spring 10.

One of these devices will usually be applied adjacent each end of each axle of the vehicle.

From the construction described it will be seen that I have devised a construction which will satisfactorily attain the object of my invention as set forth in the preamble of this specification.

What I claim as my invention is:

1. In a snubbing attachment for vehicles, the combination with the frame and axle of the vehicle, of a spindle journalled on the frame of the vehicle; a rock arm secured on said spindle; a lever connected at one end to said spindle; means connecting the other end of the lever with the axle of the vehicle; a spring secured to said rock arm, the other end of said spring being secured to a stationary part, said spring and said means being adapted to resist separation of the frame and axle, said rock arm and spring being so positioned and proportioned that the axis of the spring approaches the spindle as the rock arm is moved through increased separation of the frame and axle.

2. In a snubbing attachment for vehicles, the combination with the frame and axle of the vehicle, of a spindle journalled on the frame of the vehicle; a rock arm secured on said spindle; a lever connected at one end to said spindle; tension spring means connecting the other end of the lever with the axle of the vehicle; a spring secured to said rock arm, the other end of said spring being secured to a stationary part, said springs and means being adapted to resist separation of the frame and axle, said rock arm and spring being so positioned and proportioned that the axis of the spring approaches the spindle as the rock arm is moved through increased separation of the frame and axle.

3. In a snubbing attachment for vehicles, the combination with the frame and axle of the vehicle, of a spindle journalled on the frame of the vehicle; a rock arm secured at its centre on said spindle; a lever connected at one end to said spindle; tension spring means connecting the other end of the lever with the axle of the vehicle; a spring secured to each end of said rock arm, the other end of said springs being secured to a stationary part, said spring and means being adapted to resist separation of the frame and axle, said rock arm and springs being so positioned and proportioned that the axes of the springs approach the spindle as the rock arm is moved through increased separation of the frame and axle.

4. In a snubbing attachment for vehicles, the combination with the frame and axle of the vehicle of a casing; a cover for the casing; bolts securing the cover to the casing and also the casing to the frame of the vehicle; a spindle journalled on the frame of the vehicle; a rock arm secured at its centre on said spindle; a lever connected at one end to said spindle; tension spring means connecting the other end of the lever with the axle of the vehicle; a spring secured to each end of said rock arm, the other end of each of said springs being secured to one of said bolts, said springs and means being adapted to resist separation of the frame and axle, said rock arm and springs being so positioned and proportioned that the axes of the springs approach the spindle as the rock arm is moved through increased separation of the frame and axle.

Signed at Brantford this 30th day of April, 1921.

CHARLES ROBERT KARCH.

Witnesses:
E. R. READ,
NORA STATHAM.